US010487678B2

United States Patent
Tyler, Jr. et al.

(10) Patent No.: US 10,487,678 B2
(45) Date of Patent: Nov. 26, 2019

(54) ENGINE AIR SEALING BY SEALS IN SERIES

(71) Applicant: UNITED TECHNOLOGIES CORPORATION, Farmington, CT (US)

(72) Inventors: Terence P. Tyler, Jr., East Waterboro, ME (US); Timothy M. Davis, Kennebunk, ME (US); Jeremy Drake, South Berwick, ME (US); Jose R. Paulino, Saco, ME (US); Jaimie Schweitzer, Newton, NH (US)

(73) Assignee: United Technologies Corporation, Farmington, CT (US)

(*) Notice: Subject to any disclaimer, the term of this patent is extended or adjusted under 35 U.S.C. 154(b) by 613 days.

(21) Appl. No.: 15/162,183

(22) Filed: May 23, 2016

(65) Prior Publication Data

US 2017/0335705 A1 Nov. 23, 2017

(51) Int. Cl.
| | | |
|---|---|---|
| *F01D 11/00* | (2006.01) | |
| *F01D 11/02* | (2006.01) | |
| *F01D 11/08* | (2006.01) | |
| *F16J 15/02* | (2006.01) | |

(52) U.S. Cl.
CPC ............ *F01D 11/005* (2013.01); *F01D 11/02* (2013.01); *F01D 11/08* (2013.01); *F16J 15/025* (2013.01); *F05D 2220/32* (2013.01); *F05D 2240/56* (2013.01)

(58) Field of Classification Search
CPC ........ F01D 11/005; F01D 11/08; F01D 11/02; F16J 15/025; F05D 2240/55; F05D 2240/56; F05D 2220/32; Y02T 50/672
See application file for complete search history.

(56) References Cited

U.S. PATENT DOCUMENTS

| | | | | |
|---|---|---|---|---|
| 5,997,247 A | * | 12/1999 | Arraitz ................. | F01D 11/005 277/543 |
| 6,076,835 A | * | 6/2000 | Ress ..................... | F01D 11/005 277/637 |
| 6,340,285 B1 | * | 1/2002 | Gonyou ............... | F01D 11/005 415/116 |
| 6,860,719 B2 | * | 3/2005 | Burdgick ............. | F01D 11/005 277/642 |
| 6,984,106 B2 | * | 1/2006 | Thompson ........... | F01D 11/08 415/160 |

(Continued)

FOREIGN PATENT DOCUMENTS

| | | |
|---|---|---|
| FR | 2974839 | 11/2012 |
| WO | 2014168804 | 10/2014 |

OTHER PUBLICATIONS

EP Search report dated Oct. 6, 2017 in EP Application No. 17172278.8.

*Primary Examiner* — Justin D Seabe
*Assistant Examiner* — Adam W Brown
(74) *Attorney, Agent, or Firm* — Snell & Wilmer, L.L.P.

(57) ABSTRACT

A gas turbine engine includes a stator vane. A blade outer air seal may be adjacent to the stator vane. A seal assembly may be disposed between the blade outer air seal and the stator vane. The seal assembly may include a first seal disposed between a first airflow path and a second airflow path. A second seal may be disposed between the first airflow path and the second airflow path. The second seal may be disposed in a series arrangement with the first seal.

16 Claims, 7 Drawing Sheets

(56) References Cited

U.S. PATENT DOCUMENTS

| | | | |
|---|---|---|---|
| 8,201,834 B1* | 6/2012 | Liang | F01D 11/005 277/637 |
| 8,206,092 B2* | 6/2012 | Tholen | F01D 11/025 415/173.1 |
| 8,430,626 B1* | 4/2013 | Liang | F01D 5/22 277/412 |
| 8,961,108 B2* | 2/2015 | Bergman | F01D 25/246 415/115 |
| 9,327,368 B2* | 5/2016 | Hagan | F02C 7/28 |
| 9,874,104 B2* | 1/2018 | Shapiro | F01D 11/08 |
| 2013/0113168 A1* | 5/2013 | Lutjen | F01D 11/005 277/644 |
| 2013/0266416 A1 | 10/2013 | Bergman | |

* cited by examiner

ENGINE AIR SEALING BY SEALS IN SERIES

FIELD

The present disclosure relates to gas turbine engines, and, more specifically, to a seal between a blade outer air seal of a turbine section or a compressor section.

BACKGROUND

A gas turbine engine typically includes a fan section, a compressor section, a combustor section, and a turbine section. Air moves into the engine through the fan section. Airfoil arrays in the compressor section rotate to compress the air, which is then mixed with fuel and combusted in the combustor section. The products of combustion are expanded to rotatably drive airfoil arrays in the turbine section. Rotating the airfoil arrays in the turbine section drives rotation of the fan and compressor sections.

Gas turbine engines may have various gas-flow streams that may be kept separate from one another. The gas-flow streams may be separated by various components. Higher pressure gaspath air may tend to leak between airfoil arrays into lower pressure gaspaths. The internal engine environment is exposed to temperature extremes and other harsh environmental conditions, which may affect the integrity of the components separating different gas-flow streams. The loss of secondary flow air into the gas-path of a turbine has a negative effect on engine fuel burn, performance/efficiency, and component life.

SUMMARY

A seal assembly for a gas turbine engine is described herein, in accordance with various embodiments. The seal assembly may include a first engine component including a flange. The first engine component may be disposed between a first airflow path and a second airflow path. A first seal may be disposed between the first airflow path and the flange. A second seal may be disposed between the first airflow path and the second airflow path. The second seal may be disposed in a series arrangement with the first seal.

In various embodiments, the first airflow path may be at a pressure greater than a pressure of the second airflow path. The first seal and the second seal may be disposed in a third airflow path between the first airflow path and the second airflow path. The first seal may include at least one of a first "W" seal or a first brush seal. The second seal may comprise at least one of a second "W" seal or a second brush seal. The first seal may be disposed directly on the second seal. A second engine component may be disposed between the first airflow path and the second airflow path. The third airflow path may be disposed between the first engine component and the second engine component. The first engine component may comprise a blade outer air seal and the second engine component may comprise a stator vane.

A turbine section of a gas turbine engine is also provided. The turbine section may include a stator vane. A blade outer air seal may be adjacent to the stator vane. A first seal may be disposed between the stator vane and the blade outer air seal. A second seal may be disposed between the stator vane and the blade outer air seal. The second seal is disposed in a series arrangement with the first seal In various embodiments, the blade outer air seal may comprise a flange extending toward the stator vane. The second seal may be disposed on the flange. The blade outer air seal may comprise a seal support extending toward the stator vane. The first seal may be disposed on the seal support. The first seal may be disposed directly on the second seal. The first seal may include a first "W" seal or a first brush seal. The second seal may comprise a second "W" seal. The second seal may comprise a brush seal.

A gas turbine engine is also provided. The gas turbine engine may include a turbine section or a compressor section including a stator vane comprising a stator vane. A blade outer air seal may be adjacent to the stator vane. A first seal may be disposed between the stator vane and the blade outer air seal. A second seal may be disposed between the stator vane and the blade outer air seal. The second seal may be disposed in a series arrangement with the first seal.

In various embodiments, the first airflow path may be at a pressure greater than a pressure of the second airflow path. The first seal may be disposed directly on the second seal. The blade outer air seal may comprise a flange extending toward the stator vane. The second seal may be disposed on the flange.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
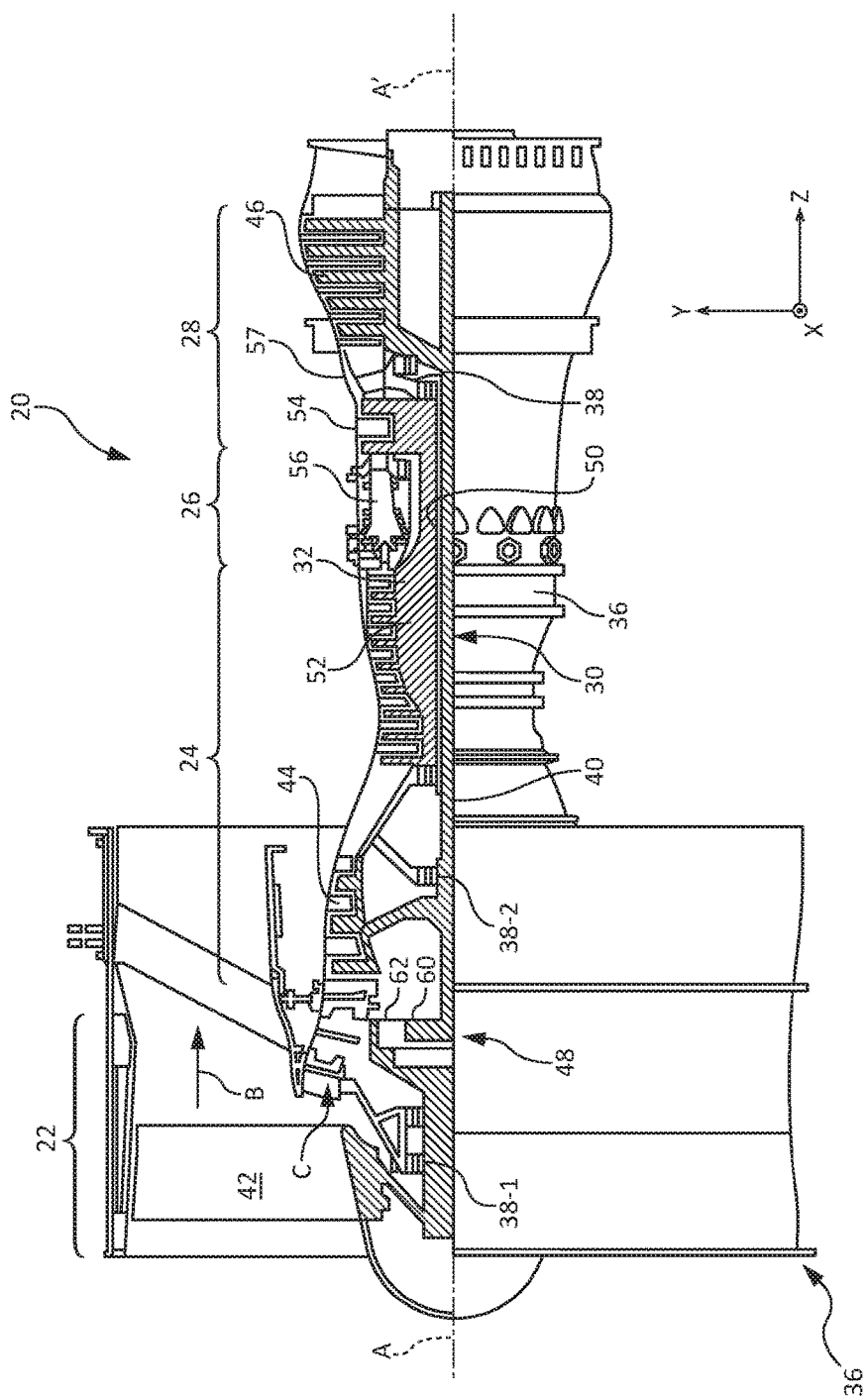
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2A:
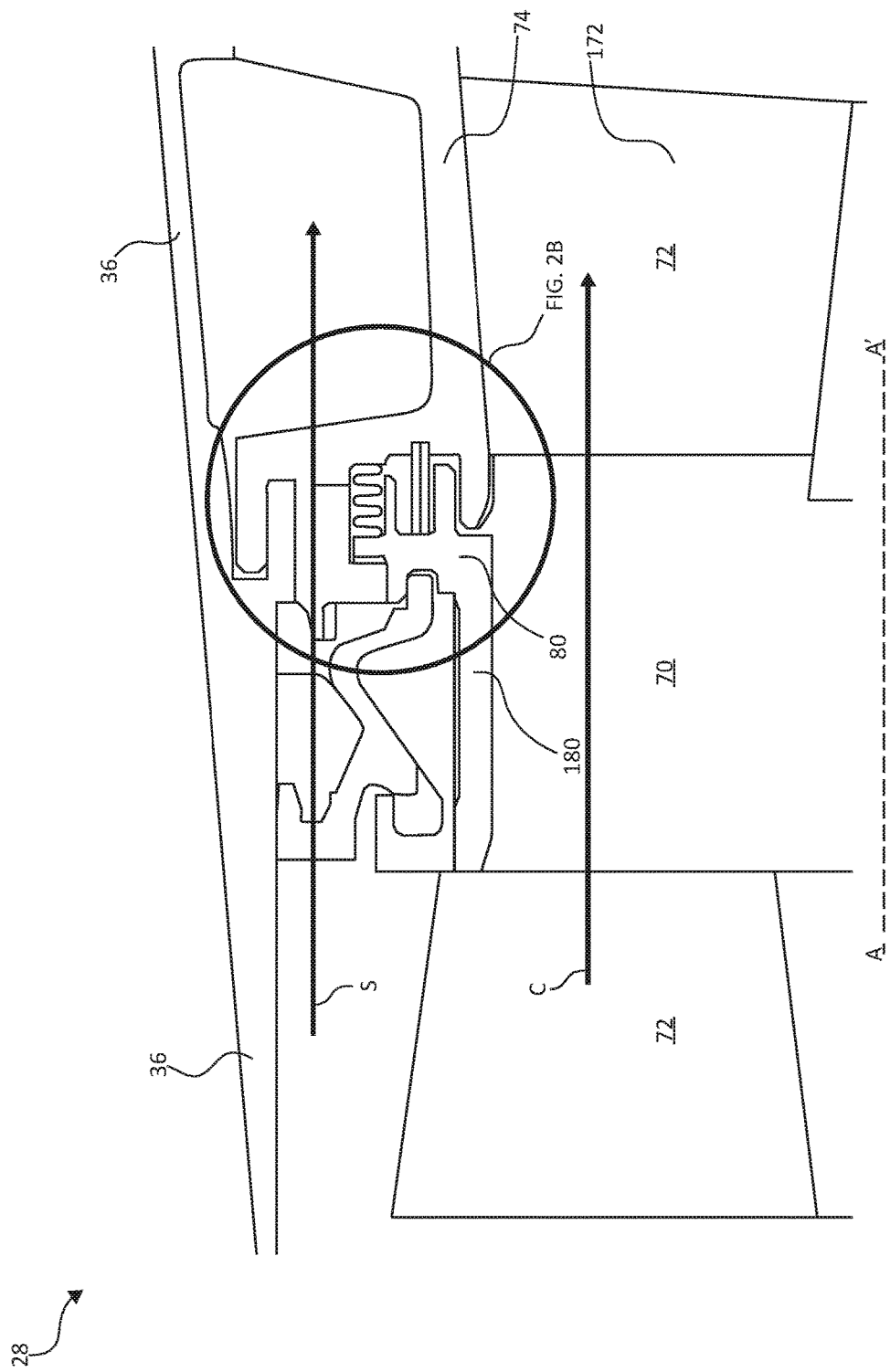
FIG. 2A illustrates a cross-sectional view of a turbine section of a gas turbine engine including rotor-stator assembly, in accordance with various embodiments.

Still referring to FIG. 1 and now to FIG. 2A, according to various embodiments, each of low pressure compressor 44, high pressure compressor 52, low pressure turbine 46, and high pressure turbine 54 in gas turbine engine 20 may comprise one or more stages or sets of rotating blades ("rotors blades") and one or more stages or sets of stationary vanes ("stator vanes") axially interspersed with the associated blade stages but non-rotating about engine central longitudinal axis A-A'. The low pressure compressor 44 and high pressure compressor 52 may each comprise one or more compressor stages. The low pressure turbine 46 and high pressure turbine 54 may each comprise one or more turbine stages. Each compressor stage and turbine stage may comprise multiple interspersed stages of rotor blades 70 and stator vanes 72. The rotor blades 70 rotate about engine central longitudinal axis A-A' with the associated shaft 40 or 50 while the stator vanes 72 remain stationary about engine central longitudinal axis A-A'. For example, FIG. 2A schematically shows, by example, a turbine stage of turbine section 28 of gas turbine engine 20. Unless otherwise indicated, the term "blade stage" refers to at least one of a turbine stage or a compressor stage. The compressor and turbine sections 24, 28 may comprise rotor-stator assemblies.

With reference to FIG. 2A, a portion of turbine section 28 is illustrated, in accordance with various embodiments. Rotor blade 70 may be, for example, a turbine rotor including a circumferential array of blades configured to be connected to and rotate with a rotor disc about engine central longitudinal axis A-A'. Upstream (forward) and downstream (aft) of rotor blade 70 are stator vanes 72, which may be, for example, turbine stators including circumferential arrays of vanes configured to guide core airflow C flow through successive turbine stages, such as through rotor blade 70. A radially outer portion 74 of stator vane 72 may be coupled to engine case structure 36.

According to various embodiments, compressor and turbine rotors may include stationary annular fluid seals, referred to as a blade outer air seal (BOAS) assembly, circumscribing the rotor blades to contain and direct core airflow C. A blade outer air seal (BOAS) assembly may include one or more BOAS segments 80 circumferentially arranged to form a ring about engine central longitudinal axis A-A' radially outward of rotor blades 70. Although only one BOAS segment 80 is shown in FIG. 2, turbine section 28 comprises an associated array of BOAS segments 80. A BOAS segment 80 may be disposed radially outward of a rotor blade 70 and/or a plurality of rotor blades 70 relative to engine central longitudinal axis A-A'. Each BOAS segment 80 may couple to an adjacent BOAS segment 80 to form the annular BOAS assembly. Each BOAS segment 80 may further couple to engine case structure 36. A BOAS assembly may thus comprise an annular structure comprising a plurality of BOAS segments 80, with each BOAS segment 80 disposed radially about one or more of a plurality of rotors blades 70. According to various embodiments, BOAS segments 80 may alternatively be formed as a unitary BOAS structure, with the same features described herein.

In various embodiments, BOAS segments 80 are coupled to axially adjacent stator vanes 72. FIG. 2A shows an area within turbine section 28 that includes BOAS segment or segments 80 disposed between forward and aft stator vanes 72. A BOAS segment 80 locally defines a radially outward boundary of core airflow path C through turbine section 28. During engine operation, stator vanes 72 and BOAS segments 80 are subjected to different thermal loads and environmental conditions. Cooling air may be provided to BOAS segment 80 and stator vanes 72 to enable operation of the turbine during exposure to hot combustion gasses produced within the combustion area, as described above. Referring momentarily to FIG. 1, pressurized air may be diverted from combustor section 26 and/or compressor section 24 and used to cool components within the turbine section 28. The BOAS assembly and stator vanes 72 may be in fluid communication with a secondary airflow source, such as an upstream compressor in the compressor section 24 or other source, which provides cooling airflow, such as bleed compressor air. A BOAS segment 80 and stator vanes 72 may be coupled to engine case structure 36 and may define a secondary airflow path S between engine case structure 36 and BOAS segment 80. A secondary airflow S is shown flowing axially downstream between engine case structure 36 and radially outer portion 74 of stator vanes 72. Secondary airflow S provides varying levels of cooling to different areas of BOAS segment 80, where a plurality of segmented seals, BOAS segments 80, may be disposed circumferentially around blades 70. A BOAS assembly may thus comprise an annular structure comprising a plurality of BOAS segments 80, with each BOAS segment 80 disposed radially about one or more of a plurality of rotors blades 70 and stator vanes 72. Secondary airflow S may have a higher pressure than core airflow C. A difference in pressure of secondary airflow S may typically be about 100-200 PSI (689-1379 kPa) greater than core airflow C at BOAS segment 80, creating a tendency for secondary airflow S to leak past BOAS segment 80 into core airflow C. As rotor blade 70 and stator vanes 72 are heated by exhaust gasses exiting the combustion chamber in core airflow C, the cooling air of secondary airflow S may undesirably escape into the turbine through a variety of gaps and other pathways core airflow C. Effective seals may therefore be incorporated between stages of BOAS segment 80 and stator vanes 72 to prevent, control, or reduce leakage of cooling air from secondary airflow S cavities into core airflow path C.

Figure 2B:
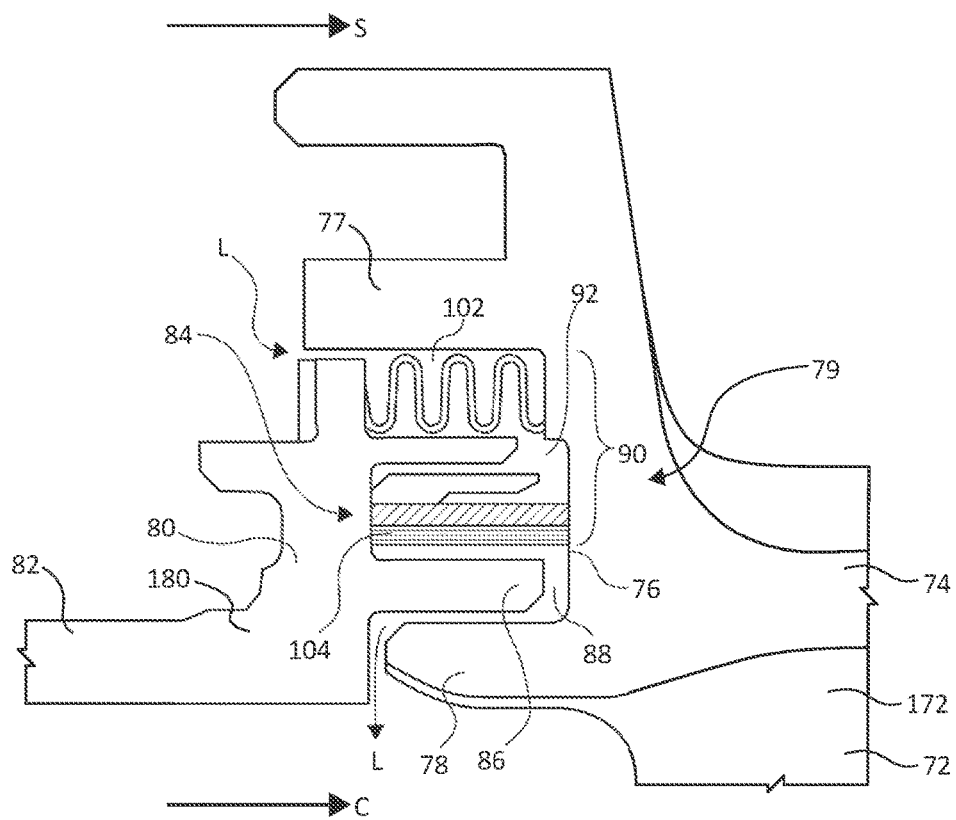
FIG. 2B illustrates a cross-sectional view of a blade outer air seal and a stator vane, in accordance with various embodiments.

Referring to FIG. 2B, BOAS segment 80 may be coupled to an axially adjacent stator vane 72, in accordance with various embodiments. An axial separation may exist between BOAS segment 80 and stator vane 72. For example, as shown, stator vane 72 may be axially separated from the BOAS segment 80 by a distance or gap 88. Gap 88 may expand and contract (axially and/or radially) in response to the thermal and/or mechanical environment. In addition, gap 88 may expand and/or contract (axially and/or radially) as a result of thermal, mechanical, and pressure loading imparted in BOAS segment 80, stator vane 72, and/or supporting structure during various transient and steady state engine operating conditions.

Cooling air from secondary airflow S may tend to leak through the distance or gap 88 between BOAS segment 80 and stator vane 72 in response to a pressure differential. Thus, a seal assembly 90 may be disposed between BOAS segment 80 and stator vane 72 to prevent, reduce, and/or control leakage of secondary airflow S through gap 88 into core airflow path C. Seal assembly 90 may include a plurality of annular seals, as described herein, and may be placed between BOAS segment 80 and stator vane 72 to limit leakage of secondary airflow S between BOAS segment 80 and stator vane 72 and into core airflow path C. Leakage of secondary airflow S into core airflow path C is illustrated as leakage airflow path L. Seal assembly 90 may form a partial seal or a complete seal between a BOAS segment 80 of stator vane 72, thereby reducing or eliminating leakage airflow L.

In various embodiments, a first engine component 180 and a second engine component 172 may be disposed between a first airflow path, such as secondary airflow path S, and a second airflow path, such as core airflow path C. The first engine component 180 and second engine component 172 may comprise any stationary or rotating engine component. The first engine component 180 may include BOAS segment 80 and the second engine component 172 may include stator vane 72. A third airflow path, such as leakage airflow L, may be disposed between the first engine component 180 and the second engine component 172.

According to various embodiments, the BOAS segment 80 may include a main body 82 that extends generally axially from a forward portion (not shown) to an aft portion 84. BOAS segment 80 may also include at least one attachment portion, such as flange 86 disposed at or near the aft portion 84. Flange 86 may extend in an axially aft direction from main body 82 toward stator vane 72. Flange 86 may alternatively extend in an axially forward direction, or in an x direction or y direction. Each axially extending flange 86 of BOAS segment 80 may correspond to a receiving portion 76 of stator vane 72 to support and attach BOAS segment 80. Stator vane 72 may also include a first attachment portion, such as flange 78 and a second attachment portion, such as flange 77 disposed at or near a forward edge portion 79 of stator vane 72. The flange 77 may be disposed radially outward from the flange 78 and define a first seal receiving groove. BOAS segment 80 may further be configured to receive flange 78 of stator vane 72. Aft portion 84 of BOAS segment 80 and forward edge portion 79 of stator vane 72 interface to form a cavity 92 or a plurality of cavities 92. Cavity 92 may be configured to house a seal assembly 90.

In various embodiments, seal assembly 90 includes a first seal 102 and a second seal 104. First seal 102 and second seal 104 may be disposed within cavity 92 between BOAS segment 80 and stator vane 72. First seal 102 may be located distally with respect to second seal 104. In various embodiments, first seal 102 may be disposed in a series arrangement with second seal 104 with respect to a leakage airflow path L. As secondary airflow S enters gap 88, between BOAS segment 80 and stator vane 72, the leakage airflow L contacts first seal 102 prior to reaching second seal 104 and if leakage airflow L is blocked by first seal 102, the leakage airflow L does not reach second seal 104. Seal assembly 90 may thus prevent or reduce the passage of cooling and/or secondary airflow S as leakage airflow L through the gap 88 defined between BOAS segment 80 and stator vane 72.

In various embodiments, first seal 102 may include a "W" seal (e.g. a seal having a "W"-shaped cross-section or that forms a "W" shape), a dog bone seal (e.g. a seal having a cross-section shaped like a dog bone), a brush seal, a rope seal, a "C" seal (e.g. a seal having a "C"-shaped cross-section or that forms a "C" shape), a crush seal, a flap seal, a feather seal, or other suitable seal. Second seal 104 may include a "W" seal, a dog bone seal, a brush seal, a rope seal, a "C" seal, a crush seal, a flap seal, a feather seal, or other suitable seal. Second seal 104 may comprise a different seal type than first seal 102 or may comprise a similar seal type as first seal 102. In various embodiments, first seal 102 and second seal 104 are complimentary in that the operational life of each of first seal 102 and second seal 104 may be extended by the type of seals used, as will be discussed herein.

Figure 3A:
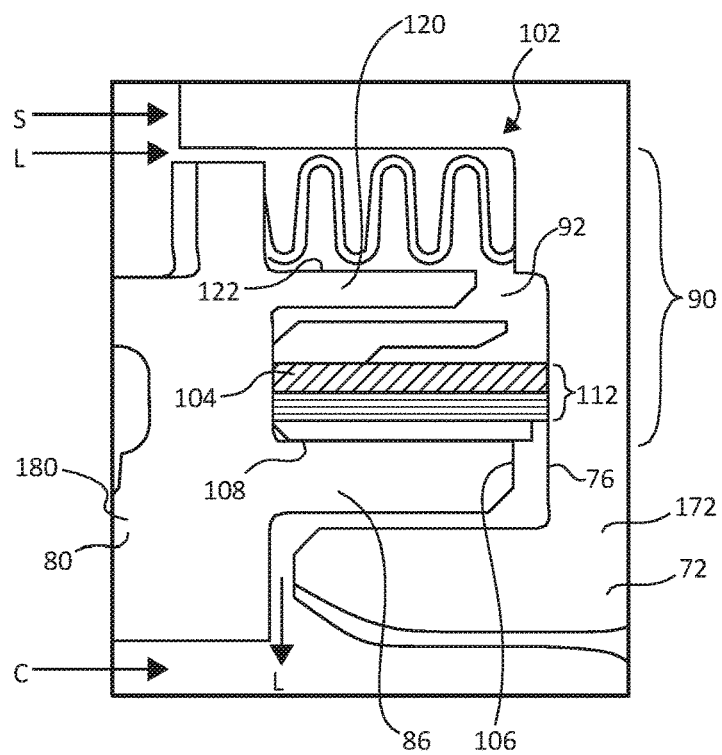
FIGS. 3A, 3B, 3C and 3D illustrate cross-sectional views of seal assemblies with a support structure, in accordance with various embodiments.

With reference to FIG. 3A, additional detail of a seal assembly 90 is shown in accordance with various embodiments. First seal 102 and second seal 104 may be configured in a series arrangement to operate under high temperature and high pressure conditions, thereby providing an improved seal within cavity 92 to reduce leakage airflow L.

In various embodiments, first seal 102 may include a "W" seal (e.g. seals having a "W"-shaped cross-section or that form a "W" shape). First seal 102 may include a metal, such as titanium, titanium-based alloy, nickel, nickel-based alloy, aluminum, aluminum-based alloy, steel, or stainless steel, or other materials. A "W" seal may be flexible enough axially to expand and seal against the walls of BOAS segment 80 and stator vane 72. First seal 102 may be biased outwardly along engine central longitudinal axis A-A' to contact aft portion 84 of BOAS segment 80 and forward edge portion 79 of stator vane 72. The "W" shape may enable first seal 102 to compress and extend as stator vane 72 moves relative to BOAS segment 80 in response to thermally driven deformations and pressure loads. Thus, first seal 102 prevents or greatly reduces leakage airflow L passing through or around first seal 102.

In various embodiments, second seal 104 may be made of materials that are capable of enduring and/or surviving in environments with relatively high temperatures associated with the various thermal loads and/or heat loads from core airflow C. Components near core airflow C may be exposed to and/or reach temperature of more than 2000° F. (approximately 1093° C.). Seal materials that are capable of surviving in environments with relatively high temperatures may generally have lower strength properties making the seals more susceptible to permanent deformation, failure, and/or liberation. In various embodiments, second seal 104 may include a brush seal. A brush seal, such as brush seal 110 in FIG. 5, may be mounted axially to the BOAS segment 80 to extend axially between BOAS segment 80 and stator vane 72. Second seal 104 may extend axially beyond an aft end 106 of flange 86 to interface with stator vane 72.

Figure 5:
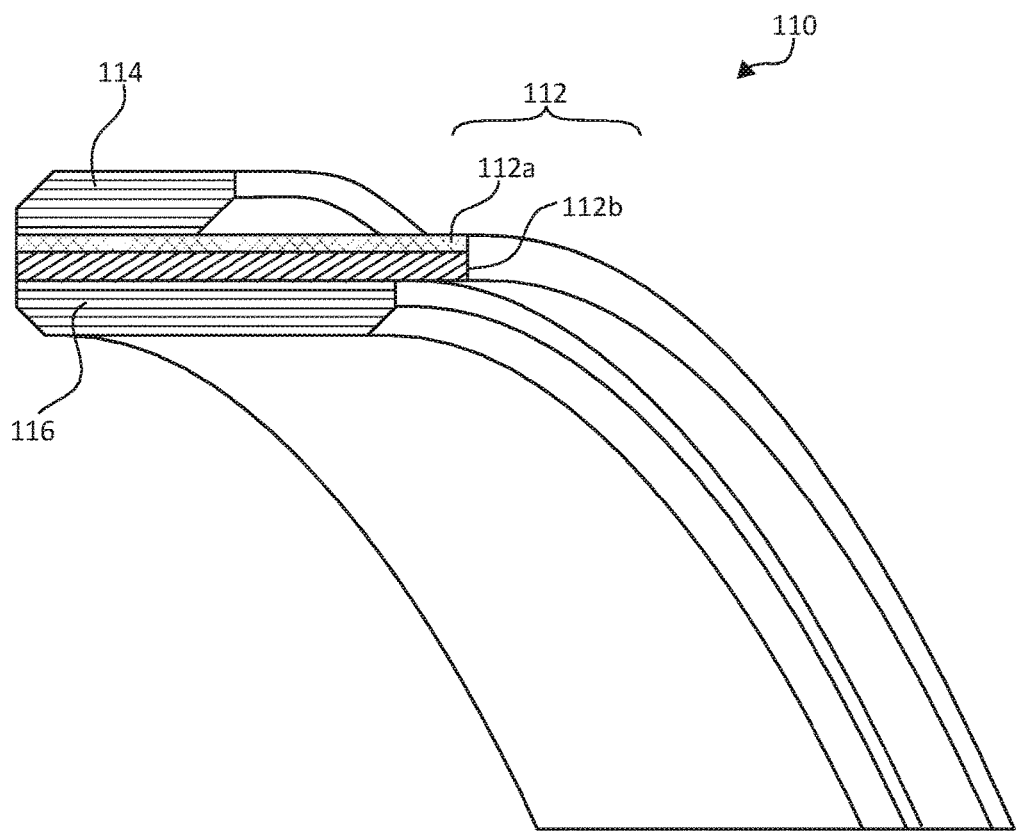
FIG. 5 illustrates a perspective cross-sectional view of a brush seal, in accordance with various embodiments.

Referring now to FIG. 5, a brush seal is shown, in accordance with various embodiments. A brush seal 110 may be used for first seal 102 or second seal 104. A brush seal may include a bristle-pack 112 that is compressed, or otherwise engaged between two metallic sheets as a top plate 114 and a backing plate 116. Bristle-pack 112 may include one or more sizes of bristle wire 112a-112b. Each wire of the bristle-pack 112, as well as top plate 114 and backing plate 116, may comprise a metal, high temperature metal, cobalt alloy, high performance nickel-chromium alloy such as an austenitic nickel-chromium-based alloy (e.g., an alloy having a nominal composition of nickel fifty-eight percent (58%), chromium 20% to 23%, iron up to 5%, molybdenum between 8% to 10%, niobium (plus tantalum) between 3.15% to 4.15% that is available under the trade name INCONEL 625™, available from Special Metals Corporation of New Hartford, N.Y., USA), or any suitable metallic, non-metallic material, and/or any other composite or alloy material. Brush seal 110 may be a continuous annular ring or may have at least one circumferential split or splice that maintains a pressure loaded, radial, contact regardless of relative thermal displacements.

Returning to FIG. 3A, BOAS segment 80 may further include a seal support 120 extending axially aft toward receiving portion 76 of stator vane 72, similarly to flange 86. Seal support 120 and flange 86 may define a second seal receiving groove. Seal support 120 may comprise a mechanical support base for first seal 102. First seal 102 and second seal 104 may generally be free-floating within cavity 92. A pressure differential between secondary airflow path S and core airflow path C may load first seal 102 against the radially outer (i.e. cylindrical) surface 122 of flange 86 and may load second seal 104 against the radially outer (i.e. cylindrical) surface 108 of flange 86. As BOAS segment 80 and stator vane 72 move axially and radially relative to each other, the brush ends of bristle-pack 112 deflect against and slide along the mating surfaces to maintain sealing.

In various embodiments, first seal 102 may be configured to withstand higher pressures than second seal 104 while maintaining an effective seal, while second seal 104 may be configured to withstand higher temperatures than first seal 102. Second seal 104 may be located between first seal 102 and core airflow path C, thereby protecting first seal 102 from exposure to hot gas and reducing thermal fatigue. First seal 102 may be located between second seal 104 and secondary airflow path S, thereby protecting second seal 104 from high pressures. Therefore, seal assembly 90 including first seal 102 and second seal 104 may optimize the sealing effectiveness and operating capabilities with a series seal arrangement.

Figure 3B:
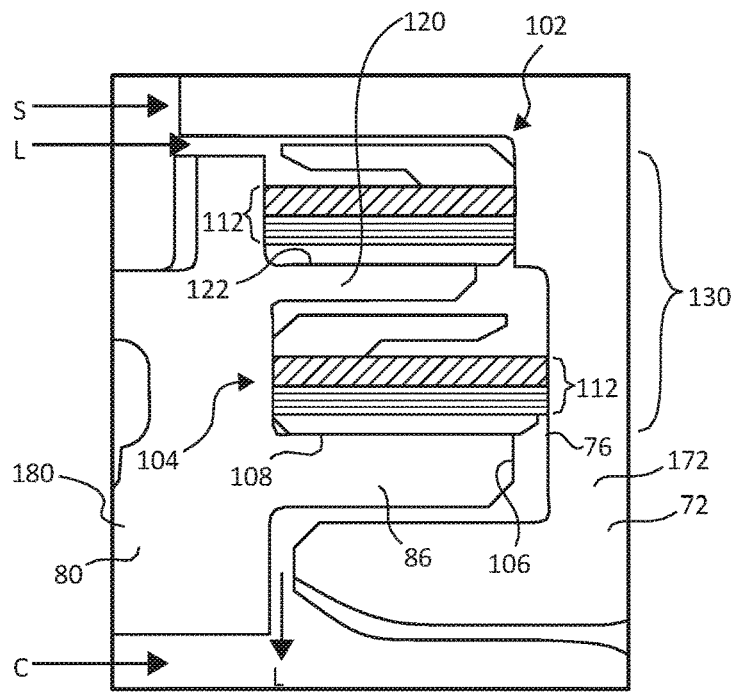

With reference to FIG. 3B, a seal assembly 130 is illustrated, in accordance with various embodiments. In various embodiments, seal assembly 130 may comprise first seal 102 located distally with respect to second seal 104. For example, first seal 102 and second seal 104 may include brush seals, similar to brush seal 110 in FIG. 5. First seal 102 may rest on seal support 120 of BOAS segment 80 such that the brush ends of bristle-pack 112 deflect against BOAS segment 80, while second seal 104 may rest on flange 86 of BOAS segment 80 such that the brush ends of bristle-pack 112 deflect against receiving portion 76 of stator vane 72. Second seal 104 may be located between first seal 102 and core airflow path C. First seal 102 may be located between second seal 104 and secondary airflow path S, thereby protecting second seal 104 from high pressures. The series arrangement of first seal 102 and second seal 104 may result in better performance capability in high pressure airflow paths as compared to, for example, a single brush seal, and a more robust seal than, for example, a single "W" seal. Therefore, seal assembly 130 including first seal 102 and second seal 104 may increase the sealing effectiveness and operating capabilities with a series seal arrangement.

Figure 3C:
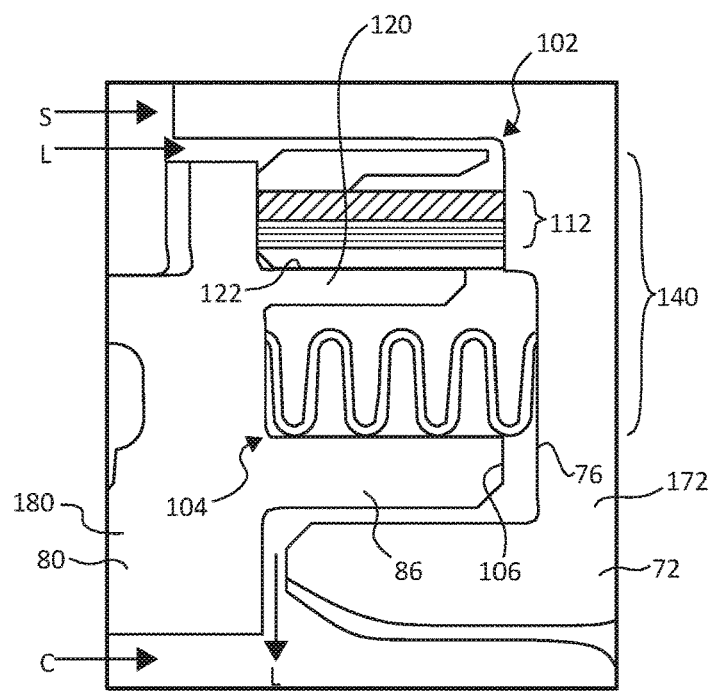

With reference to FIG. 3C, a seal assembly 140 is illustrated, in accordance with various embodiments. In various embodiments, seal assembly 140 may comprise first seal 102 located distally with respect to second seal 104. First seal 102 may be disposed in a series arrangement with second seal 104 with respect to a leakage airflow path L. For example, first seal 102 may include a brush seal, similar to brush seal 110 in FIG. 5. First seal 102 may rest on flange 86 of BOAS segment 80 such that the brush ends of bristle-pack 112 deflect against receiving portion 76 of stator vane 72. Second seal 104 protects first seal 102 from conditions in core airflow path C, while first seal 102 protects second seal 104 from conditions in secondary airflow path S. The series seal arrangement of seal assembly 140 having a plurality of seals results in increased effectiveness of each seal for a reduction in leakage airflow.

Figure 3D:
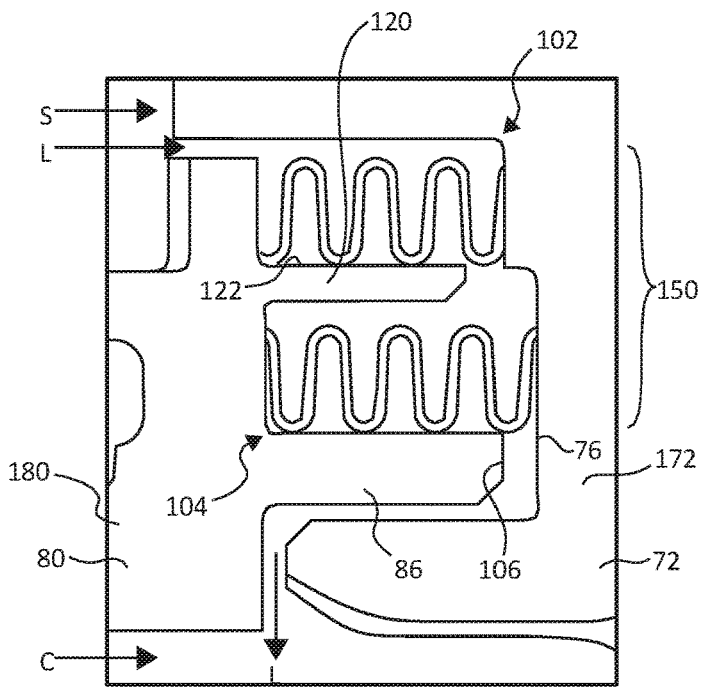

With reference to FIG. 3D, a seal assembly 150 is illustrated, in accordance with various embodiments. In various embodiments, seal assembly 150 may comprise first seal 102 located distally with respect to second seal 104. For example, first seal 102 may include a "W" seal, and second seal 104 may include a "W" seal. Second seal 104 may be located between first seal 102 and core airflow path C, thereby protecting first seal 102 from high temperatures. Therefore, seal assembly 130 including first seal 102 and second seal 104 may increase the sealing effectiveness and operating capabilities with a series seal arrangement. The series seal arrangement of seal assembly 140 having a plurality of seals results in increased effectiveness of each seal and a reduction in leakage airflow.

Figure 4A:
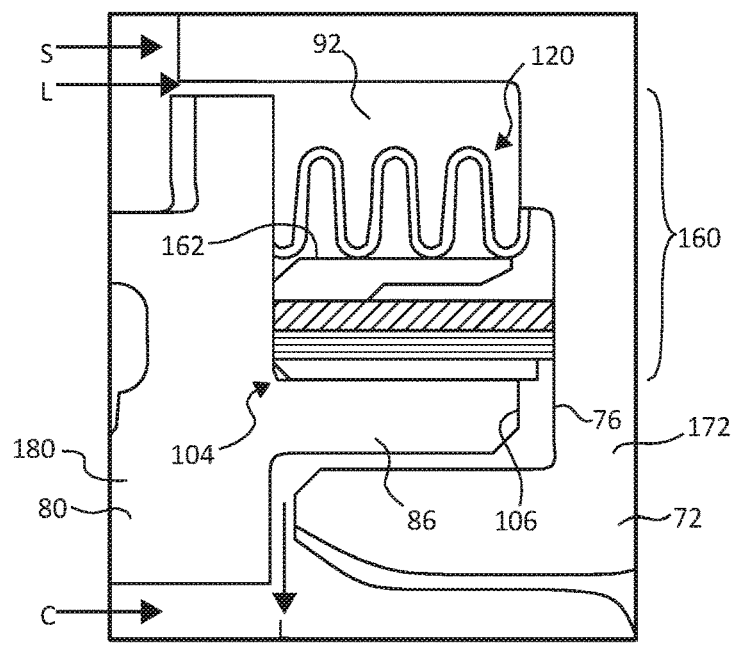
FIGS. 4A, and 4B illustrate cross-sectional views of seal assemblies, in accordance with various embodiments.
Figure 4B:
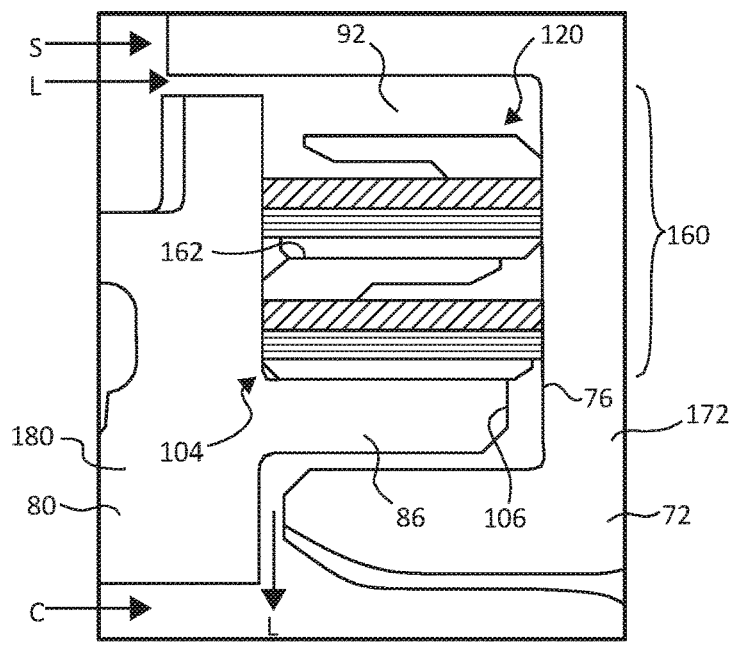

With reference now to FIGS. 4A and 4B, seal assemblies may comprise a plurality of seals in series. In various embodiments, as shown with respect to FIGS. 4A and 4B, a seal assembly 160 may comprise a first seal 102 and a second seal 104, with the second seal 104 disposed radially inward or proximally with respect to first seal. Each of the first seal 102 and a second seal 104 in FIGS. 4A and 4B may comprise a seal similar or identical to first seal 102 and second seal 104 described above with respect to FIGS. 3A, 3B, 3C, and 3D. Seal assembly 160 may comprise the benefits similar to those discussed with respect to FIGS. 3A, 3B, 3C, and 3D. Additionally, during standard operation of the gas turbine engine, in response to receiving a flow of fluid, such as secondary airflow path S and core airflow path C, stator vane 72 may move axially, radially, and/or circumferentially relative to BOAS segment 80. First seal 102 is disposed directly on a radial outer surface, i.e. first surface 162, of second seal 104. In various embodiments, first seal 102 and/or second seal 104 may have a generally annular geometry, and may include a continuous ring or split ring shape. With first seal 102 directly contacting second seal 104, rather than contacting a circumferentially segmented structure, first seal 102 experiences less wear, particularly at its radially inward surface. By resting first seal 102 directly on second seal 104, first seal 102 experiences less axial, radial, and circumferential friction and wear, thereby extending the operational life of first seal 102. Additionally, by resting first seal 102 directly on second seal 104, the space occupied by seal assembly 160 within cavity 92 may be reduced, thereby increasing the design flexibility for seal assembly 160 and other components, such as BOAS segment 80 and stator vane 72.

Thus, well-sealed gaps between components along the radially inward direction (i.e., along the y axis), such as BOAS segment 80 and stator vane 72, reduce leakage airflow L into airflow path C and reduce negative performance impacts (such as efficiency). In addition, while a turbine stage is depicted in FIG. 2A, it is to be understood that various embodiments may be utilized for static gas turbine engine components in any turbine stage of the high pressure turbine or low pressure turbine and in any compressor stage of the high pressure compressor or the low-pressure compressor. While a BOAS segment having specially configured seal assembly for deflecting core airflow C air has been described in accordance with various embodiments, it is to be understood that other gas turbine engine components may benefit from an optimized seal assembly according to various embodiments.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal assembly of a gas turbine engine, comprising:
a first engine component including a first flange and a second flange disposed radially outward from the first flange, the first flange and the second flange defining a first seal receiving groove, the first engine component disposed between a secondary airflow path and a core airflow path;
a second engine component having a radially outer flange and a radially inner flange defining a second seal receiving groove, the radially outer flange and the radially inner flange disposed in the first seal receiving groove of the second engine component;
a first seal disposed between the radially inner flange and the radially outer flange and disposed in the second seal receiving groove and a portion of the first seal receiving groove; and
a second seal disposed between the second flange of the first engine component and the radially outer flange of the second engine component and disposed in a portion of the first seal receiving groove.

2. The seal assembly of claim 1, wherein the secondary airflow path is at a first pressure greater than a second pressure of the core airflow path.

3. The seal assembly of claim 2, wherein the first seal and the second seal are disposed in a leakage airflow path.

4. The seal assembly of claim 3, wherein the first seal comprises a brush seal.

5. The seal assembly of claim 4, wherein the second seal comprises a "W" seal.

6. The seal assembly of claim 1, wherein the first engine component comprises a blade outer air seal and the second engine component comprises a stator vane.

7. A turbine section of a gas turbine engine, comprising:
a stator vane having a first stator flange and a second stator flange disposed radially outward from the first stator flange and defining a first seal receiving groove;
a blade outer air seal adjacent to the stator vane having a first blade outer air seal flange and a second blade outer air seal flange disposed radially outward from the first blade outer air seal flange and defining a second seal receiving groove;
a first seal disposed between the first blade outer air seal flange and the second blade outer air seal flange and disposed in a first portion of the first seal receiving groove and disposed in the second seal receiving groove; and
a second seal disposed between the second blade outer air seal flange and the second stator flange and disposed in a second portion of the first seal receiving groove.

8. The turbine section of claim 7, wherein the second blade outer air seal flange comprises a seal support extending toward the stator vane.

9. The turbine section of claim 7, wherein the first seal comprises a brush seal.

10. The turbine section of claim 9, wherein the second seal comprises a "W" seal.

11. The turbine section of claim 7, wherein the first seal comprises a first "W" seal, and the second seal comprises a second "W" seal.

12. The turbine section of claim 7, wherein the first blade outer air seal flange and the second blade outer air seal flange are disposed in the first seal receiving groove of the stator vane.

13. A gas turbine engine, comprising:
a turbine section or a compressor section including a stator vane having a first stator flange and a second stator flange disposed radially outward from the first stator flange and defining a first seal receiving groove;
a blade outer air seal adjacent to the stator vane, the blade outer air seal having a first blade outer air seal flange and a second blade outer air seal flange disposed radially outward from the first blade outer air seal flange and defining a second seal receiving groove;
a first seal disposed between the first blade outer air seal flange and the second blade outer air seal flange and disposed in a first portion of the first seal receiving groove and disposed in the second seal receiving groove; and
a second seal disposed between the second blade outer air seal flange and the second stator flange and disposed in a second portion of the first seal receiving groove,
wherein the second seal is disposed radially outward and in a series arrangement with the first seal.

14. The gas turbine engine of claim 13, wherein the first seal and the second seal are disposed between a secondary airflow path and a core airflow path and wherein the secondary airflow path is configured to be at a pressure greater than the core airflow path.

15. The gas turbine engine of claim 13, wherein the blade outer air seal comprises the second blade outer air seal flange comprises a seal support extending toward the stator vane, the second seal being disposed on the seal support.

16. The gas turbine engine of claim 13, wherein the first blade outer air seal flange and the second blade outer air seal flange are disposed in the first seal receiving groove of the stator vane.

* * * * *